June 17, 1958 R. E. JEANFAVRE 2,839,325
TONGS
Filed Sept. 26, 1957
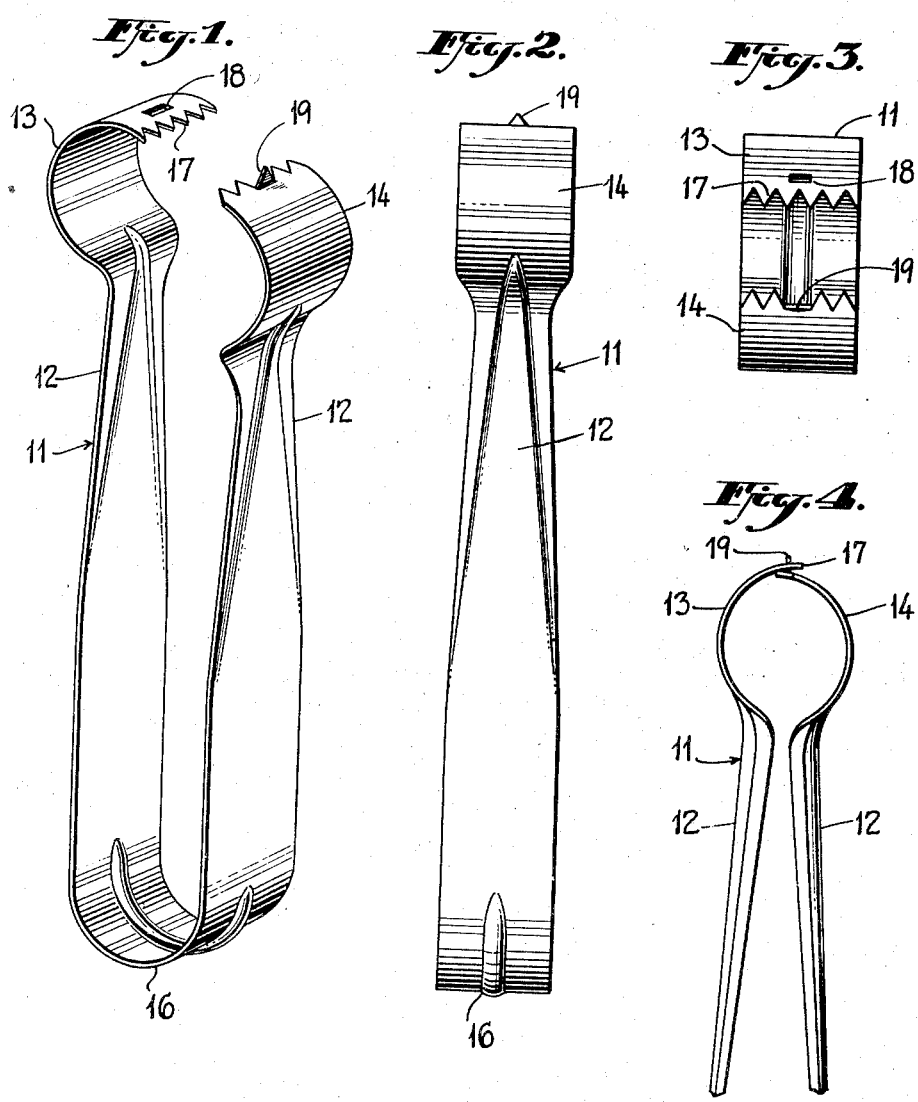
INVENTOR.
ROGER E. JEANFAVRE.
BY
ATTORNEYS.

United States Patent Office 2,839,325
Patented June 17, 1958

2,839,325
TONGS

Roger E. Jeanfavre, Litchfield, Conn., assignor to The Turner & Seymour Mfg. Company, Torrington, Conn.

Application September 26, 1957, Serial No. 686,305

2 Claims. (Cl. 294—99)

This invention relates to improvements in tongs. More particularly, the invention relates to improved devices in the nature of tongs designed for picking up relatively small objects, such as, ice cubes, lumps of sugar, etc.

Such tongs usually have their opposed portions resiliently connected together so that the jaws tend to stay apart in an open position when not in use and the jaws frequently have serrated edges to aid in grasping the objects being picked up. When such tongs are stored while not in use they are usually left in the open position since the locking devices which have been available previously for securing tongs in the closed position have been complicated and expensive and therefore not suitable for use on the great majority of cases. Storing such tongs in the closed position is advantageous not only because of the smaller amount of space required for storage but also because the possibility of the serrated edges catching on or scratching other objects is substantially reduced.

The present invention provides an improved type of tongs which can be quickly and easily secured in a closed condition for storage without the use of complicated or expensive locking devices, but which may be manufactured at substantially no extra cost.

According to one aspect of this invention, a pair of tongs is provided which includes a pair of resiliently connected opposing jaws, one of which has a small cavity, notch, detent like means or hole therein and the other of which preferably has a serrated edge including projecting teeth, at least one of which teeth is bent out of alignment with the remainder of the teeth and is thereby adapted to enter the cavity, hole or the like, in the other jaw to retain the jaws in a closed position.

Various further and more specific features and advantages of the invention will appear from the description taken in connection with the accompanying drawings which form a part of this specification and illustrate by way of example one embodiment of the invention. The invention consists in such novel features and combinations of parts as may be shown and described in connection with the device disclosed.

In the drawings:

Fig. 1 is a perspective view showing a pair of tongs constructed in accordance with this invention;

Fig. 2 is a side view of the tongs shown in Fig. 1;

Fig. 3 is an end view of the tongs shown in Figs. 1 and 2; and

Fig. 4 is an elevation view of the tongs shown in Figs. 1–3 with the tongs locked in the closed position.

Referring to the drawings, in further detail, a pair of tongs 11 is shown, constructed from a piece of resilient material, such as, spring steel, which has been shaped to form handle portions 12 and jaws 13 and 14. The resiliency of the material at the end connecting portion 16 of the tongs causes the jaws 13 and 14 normally to remain relatively widely separated from each other unless the tongs are compressed by pressing the portions 12 towards each other. When the tongs are compressed by pressure on portions 12 of the handle, the jaws 13 and 14 move towards each other and the object to be picked up is grasped between the edges of the jaws.

The jaws 13 and 14 preferably terminate in serrated edges having teeth such as 17. Thus when the jaws are moved toward one another the teeth cooperate to grasp the object being picked up.

In order to provide a simple means for locking the tongs with the jaws in the closed position, a hole, slot, or the like 18 is provided in jaw 13 in back of and relatively near the serrated edge of the jaw. A tooth 19 on jaw 14 is bent to an offset position, for example, upwards, preferably as shown to an angle of about 90°, so that when the jaws 13 and 14 are pressed together sufficiently far the tooth 19 will engage in the hole 18 and prevent the jaws from springing apart again when the pressure is released from portions 12 of the handle. Once the tong's jaws have been locked together in this manner it requires merely a slight pressure in the downward direction on the end of jaw 14 or an upward pressure on jaw 13 to release the tooth 19 from the hole 18 so that the jaws again spring apart and the tongs may be used in the normal manner.

The arrangement as described has the advantage of being economically feasible since it requires only punching a hole, cavity or the like in one jaw and bending to an offset position a tooth on the other jaw. At the same time the device is extremely simple in operation and is entirely effective in keeping the jaws of the tongs in the closed position when not in use.

While the invention has been described in detail with respect to a preferred embodiment, it will be understood by those skilled in the art that various modifications may be made without departing from the spirit and scope of the invention and it is intended to cover all such changes and modifications in the appended claims.

I claim:

1. A tongs-like article comprising in combination superimposed spaced apart handle portions connected at adjacent ends by a resilient portion normally holding the tongs in open condition, said handle portions carrying on their ends remote from said resilient portion, resilient jaw portions having opposed inwardly extending edge portions adapted to be brought into close relationship for grasping an object and also adapted to be brought into an overlapping closed relationship for storage, one of said edge portions having a serrated edge including teeth, the other of said edge portions being formed with an aperture, one of said teeth being offset in a direction toward the apertured edge portion when the edge portions overlap, such offset tooth being adapted to engage said aperture when the edge portions are moved into overlapping relationship whereby the jaw portions are secured in closed relationship.

2. Tongs adapted to hold lumps of sugar, ice and the like, comprising in combination a pair of superimposed spaced apart handle portions connected together at adjacent ends by resilient means normally biasing the tongs in open position, said handle portions carrying on their adjacent ends remote from said resilient means, resilient sheet metal jaw portions having opposed inwardly extending edge portions adapted to be brought into close relationship in order to grasp such lumps and also adapted to be brought into an overlapping relationship, one of said edge portions being formed with a tooth projecting in a direction toward the other edge portion when the edge portions are in overlapped relation and the other of said edge portions being formed with an aperture shaped to receive said projecting tooth when the edge portions are moved into said overlapping relationship thereby securing the jaw portions closed for storage.

References Cited in the file of this patent

UNITED STATES PATENTS

| | | |
|---|---|---|
| 533,923 | Seyfriedt | Feb. 12, 1895 |
| 1,540,694 | Herrick | June 2, 1925 |
| 2,417,335 | Westby | Mar. 11, 1947 |
| 2,601,766 | Riddell et al. | July 1, 1952 |
| 2,690,657 | Milewski | Oct. 5, 1954 |

FOREIGN PATENTS

| | | |
|---|---|---|
| 615,801 | Germany | July 12, 1935 |